US010278509B2

(12) United States Patent
Fujita et al.

(10) Patent No.: US 10,278,509 B2
(45) Date of Patent: May 7, 2019

(54) LUMBAR SUPPORT STRUCTURE AND SEAT STRUCTURE

(71) Applicant: Delta Tooling Co., Ltd., Hiroshima-shi (JP)

(72) Inventors: Etsunori Fujita, Higashihiroshima (JP); Ryuji Kuwano, Hiroshima (JP); Masahiro Kuromoto, Aki-gun (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 15/519,449

(22) PCT Filed: Aug. 24, 2015

(86) PCT No.: PCT/JP2015/073644
§ 371 (c)(1),
(2) Date: Apr. 14, 2017

(87) PCT Pub. No.: WO2016/059876
PCT Pub. Date: Apr. 21, 2016

(65) Prior Publication Data
US 2017/0238713 A1    Aug. 24, 2017

(30) Foreign Application Priority Data
Oct. 16, 2014   (JP) .................. 2014-211640

(51) Int. Cl.
*A47C 7/46* (2006.01)
*A47C 31/00* (2006.01)
*B60N 2/66* (2006.01)

(52) U.S. Cl.
CPC ................ *A47C 7/462* (2013.01); *A47C 7/46* (2013.01); *A47C 31/006* (2013.01); *B60N 2/66* (2013.01)

(58) Field of Classification Search
CPC ......... A47C 7/462; A47C 7/46; A47C 31/006; B60N 2/66
(Continued)

(56) References Cited

U.S. PATENT DOCUMENTS 4,564,235 A * 1/1986 Hatsutta .................. B60N 2/66
                                                            297/284.4
5,505,520 A    4/1996 Frusti et al.
(Continued)

FOREIGN PATENT DOCUMENTS

JP    3-29610 A    2/1991
JP    5-34956 U    5/1993
(Continued)

OTHER PUBLICATIONS

International Search Report dated Oct. 13, 2015 in PCT/JP2015/073644 Filed Aug. 24, 2015.
(Continued)

*Primary Examiner* — Syed A Islam
(74) *Attorney, Agent, or Firm* — Oblon, McClelland, Maier & Neustadt, L.L.P.

(57) ABSTRACT

A back cushioning member having a tensile structure to reduce discomfort of a seated person. A lower lumbar support 10 installed in a lower portion of a back frame 111 and an upper lumbar support 20 installed in an upper portion of the lower lumbar support 10 are provided. Having vertically two lumbar supports 10, 20 enables a first support plate 12 of the lower lumbar support 10 to be provided so as to correspond mainly to a pelvis part where the sense of contact is hardly perceived, whereby the back cushioning member 112 having a tensile structure can be provided with a predetermined restoring force at a predetermined applicable elastic strength. Since the pelvis part located at a lower portion of a human body can be supported reliably, preven-
(Continued)

tion of collapse of posture can be facilitated. Since the upper lumbar support 20 corresponds mainly to a lumbar part, by setting the upper lumbar support 20 to provide a softer springiness than the lower lumbar support 10, the sense of contact in the lumbar part is suppressed and the feeling during seating can be improved.

4 Claims, 5 Drawing Sheets

(58) Field of Classification Search
USPC .............. 297/284.3, 284.4, 216.13, 216.14
See application file for complete search history.

(56) References Cited

U.S. PATENT DOCUMENTS

| | | | | |
|---|---|---|---|---|
| 6,530,622 | B1* | 3/2003 | Ekern ................. | B60N 2/2222 |
| | | | | 297/284.1 |
| 2002/0121802 | A1* | 9/2002 | McMillen ............. | A47C 7/462 |
| | | | | 297/284.7 |
| 2004/0212234 | A1 | 10/2004 | Fujita et al. | |
| 2007/0057550 | A1 | 3/2007 | Beyer et al. | |
| 2010/0187874 | A1* | 7/2010 | Matsui ................ | B60N 2/4228 |
| | | | | 297/216.12 |
| 2013/0175838 | A1 | 7/2013 | Oshima et al. | |
| 2015/0305506 | A1* | 10/2015 | Suzuki ................. | B60N 2/66 |
| | | | | 297/284.4 |
| 2016/0360889 | A1* | 12/2016 | Matlin ................. | A47C 7/02 |
| 2016/0374475 | A1* | 12/2016 | Aldrich ............... | A47C 7/462 |
| | | | | 297/284.3 |

FOREIGN PATENT DOCUMENTS

| | | | |
|---|---|---|---|
| JP | 06191334 A | * | 7/1994 |
| JP | 7-25853 U | | 5/1995 |
| JP | 8-182572 A | | 7/1996 |
| JP | 8-205956 A | | 8/1996 |
| JP | 11-253268 A | | 9/1999 |
| JP | 2004-209017 A | | 7/2004 |
| JP | 2004-229957 A | | 8/2004 |
| JP | 2006-346275 A | | 12/2006 |
| JP | 2008-531224 A | | 8/2008 |
| WO | WO 02/074576 A1 | | 9/2002 |
| WO | 2012/043807 A1 | | 4/2012 |

OTHER PUBLICATIONS

Extended European Search Report dated Apr. 24, 2018 in Patent Application No. 15850414.2, citing documents AA, AB, AO, AP, and AQ therein, 8 pages.

* cited by examiner

LUMBAR SUPPORT STRUCTURE AND SEAT STRUCTURE

TECHNICAL FIELD

The present invention relates to a lumbar support structure incorporated in a seat structure for transport equipment such as an automobile, an airplane, and a train, and a seat structure including the lumbar support structure.

BACKGROUND ART

For example, Patent Document 1 discloses a lumbar support for an automobile in which a torsion bar formed in a substantially U-shape is used, an upper arm part of the torsion bar is supported by a seat frame, and a middle arm part and a lower arm are supported by a plate for support. A support pressure by the plate for support is adjustable by adjusting a front and back position of the upper arm part. Horizontal oscillation of the plate for support is eliminated by providing the middle arm part and the lower arm part. The feeling during seating is improved by preventing center shift of the plate for support. Patent Document 2 discloses a structure in which a support member formed of a seat-shape member such as a cloth and a rubber is stretched in a portion corresponding to a lumbar part of a seated person by using a coil spring. In this support member, a fixed support member and an adjustable support member of which extension can be adjusted by tensioning and loosening by length adjustment, are arranged in lamination, the fixed support member exhibits a fundamental support pressure of a lumbar part of a seat back, and the adjustable support member has functions of back-up at a time of breakage of the fixed support member and adjustment of a support pressure of a top part.

PRIOR ART DOCUMENT

Patent Document

Patent Document 1: Japanese Patent Application Publication No. H08-205956
Patent Document 2: Japanese Patent Application Publication No. 2006-346275

SUMMARY OF THE INVENTION

Problem to be solved by the Invention

The lumbar support device of Patent Document 1 is applied to the one that supports a back of a seated person by the cushioning property of a material itself such as a urethane material having a predetermined thickness, and not to a back cushioning member having a tensile structure bridged in a back frame. The back cushioning member having a predetermined thickness such as the urethane material can have various functions such as horizontal oscillation prevention as described above by using the one that supports for a relatively large area, without much consideration of the sense of contact of the plate for support in the lumbar support device. However, when it is a cushion member for back of a tensile structure bridged in a back frame, cushioning property is applied by utilizing its tension and used material is relatively thin one such as a two-dimensional fabric and a three-dimensional fabric represented by a three-dimensional knitted fabric. Supporting by using the plate for support for a large area impairs the cushioning property of the tensile structure and generates unnecessary sense of contact for the seated person.

Patent Document 2 is for a back cushioning member of a tensile structure. Thereby, in order not to impair the cushioning property utilizing its tension, a support member is set for a range from a pelvic part to a lumbar part. In addition, in order to reduce the sense of contact for the seated person, the support member is formed of a cloth or rubber. However, Patent Document 2 has a structure in which the fixed support member and the adjustable support member are arranged in lamination, the two are arranged in the same position, adjustment of the support pressure is adjustment for the entire range of the support member, and Patent Document 2 may give a sense of discomfort near an upper edge portion of the support member corresponding to the lumbar part that is sensitive than the pelvic part, depending on the support pressure.

The present invention has been made in consideration of the above, and has a problem of providing a lumbar support structure that is suitable for a back cushioning member of a tensile structure and can reduce discomfort for the seated person more than conventional ones, and a seat structure including the lumbar support structure.

Means for Solving the Problem

In order to solve the problem, the lumbar support structure of the present invention is characterized by
being arranged in a seat back,
being installed in a back-surface side of a back cushioning member of a structure bridged in a back frame composing the seat back,
and having: a lower lumbar support that has a first torsion bar, and a first support plate that is supported by the first torsion bar and can be displaced elastically by receiving a load, the first support plate being set in a lower portion of the back frame, elastically supporting the cushioning member for a back and imparting a restoring force to the back cushioning member;
and an upper lumbar support that has a second torsion bar, a second support plate that is supported by the second torsion bar and can be displaced elastically by receiving a load, and a lumbar adjustment means that twists the second torsion bar and adjusts a position of the second support plate to front and back, the second support plate being set in an upper portion of the first support plate.

It is preferable that the first support plate of the lower lumbar support is set in a position corresponding to a pelvic part of a seated person, and the second support plate of the upper lumbar support is set in a position corresponding to a lumbar part of the seated person.

It is preferable that elastic forces of the first torsion bar and the second torsion bar are set so that a stroke in front and back at a time of receiving the load of the second support plate composing the upper lumbar support is larger than that of the first support plate composing the lower lumbar support.

It is preferable that the back cushioning member is configured by including a two-dimensional fabric, a three-dimensional fabric, or a combination thereof.

The seat structure of the present invention includes a seat back having a back cushioning member having a structure bridged in a back frame,
and is characterized by incorporating any of the lumbar support structures in a back-surface side of the back cushioning member.

EFFECT OF THE INVENTION

According to the present invention, the back frame of the seat back has the lower lumbar support installed in the lower portion and the upper lumbar support installed in the upper portion thereof. Preferably, the first support plate of the lower lumbar support is installed in a portion corresponding to a pelvic part of a seated person and the second support plate of the upper lumbar support is installed in a portion corresponding to a lumbar part of a seated person. Since the back frame has upper and lower two lumbar supports, the first support plate of the lower lumbar support can be provided corresponding mainly to the pelvic part that is hard to perceive a sense of contact. Thereby, the first support plate can be provided with a predetermined strength of elasticity with which a predetermined restoring force can be imparted to the back cushioning member of the tensile structure. In addition, since the lower lumbar support can support reliably the pelvic part located at a lower portion of a human body, it is useful for preventing a posture from being collapsed. Since the upper lumbar support corresponds mainly to the lumbar part, the sense of contact in the lumbar part is prevented and the feeling during seating can be improved by setting the upper lumbar support to have softer springiness than that of the lower lumbar support. On the other hand, since the upper lumbar support is provided with a lumbar adjust means, adjustment to a preferable support pressure of the lumbar part can be performed by adjusting the position of the second support plate to front and back.

That is, the present invention imparts the restoring force to the back cushioning member of the tensile structure, and makes the lower lumbar support have a function of improving the appearance, while the present invention increases supporting property of the pelvic part by the lower lumbar support, the present invention also can support the pelvic part with a preferred support pressure while reducing the sense of contact by the upper lumbar support, and can improve the feeling during seating more than conventional ones.

Each of the support plates is supported by the torsion bar, compared with a case where each of the support plates is supported by a coil spring, an upper edge portion of each of the support plates is easy to be displaced in front and back. By this movement, support along an angle of a back can be performed, the sense of contact can be reduced more and followability to change of the posture is superior.

DESCRIPTION OF THE EMBODIMENTS

Figure 1:
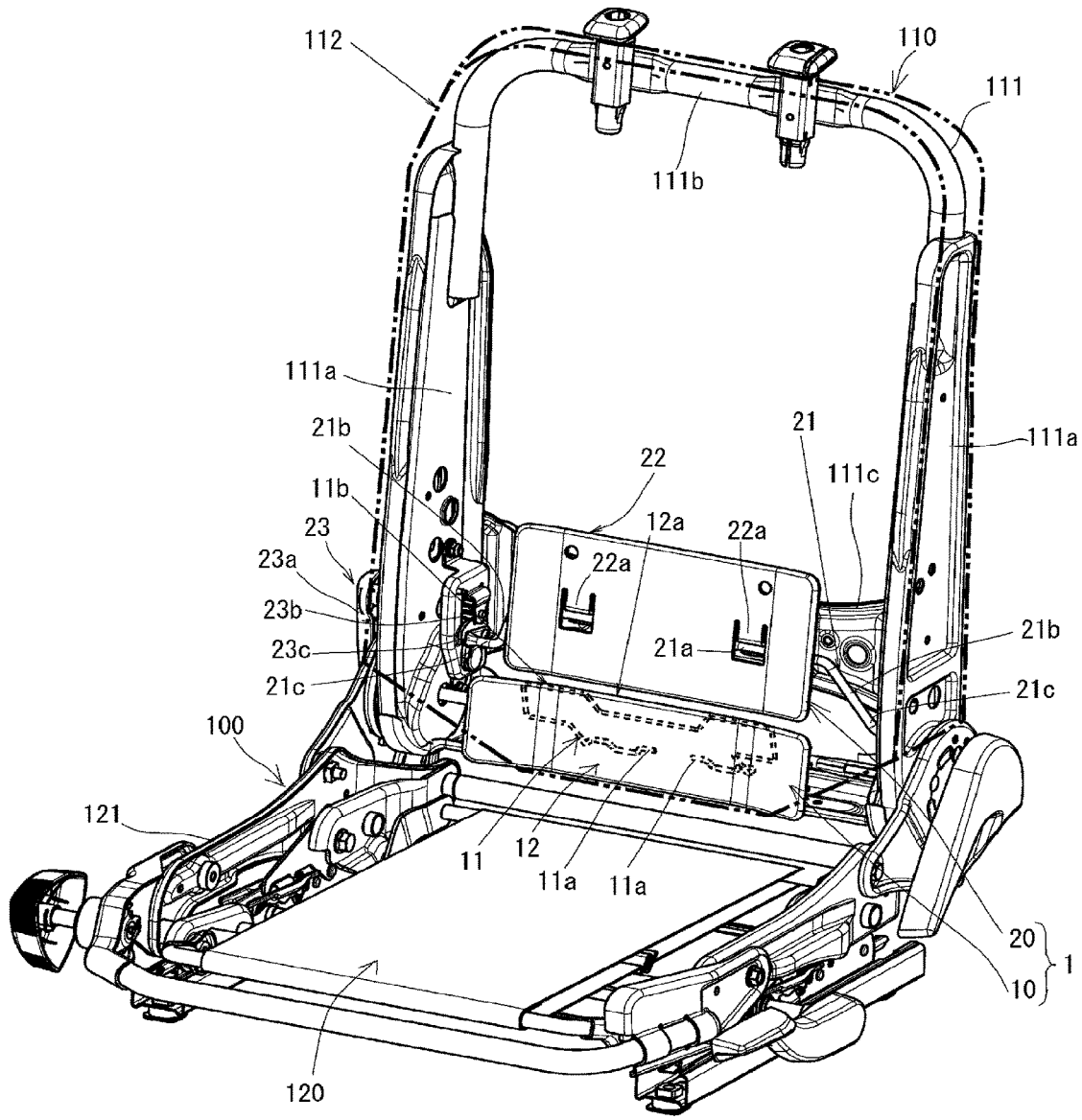
FIG. 1 is a perspective view showing main parts of a seat structure in which a lumbar support structure according to an embodiment of the present invention is installed in a back frame composing a seat back.

Following further describes the present invention in detail on the basis of the embodiments shown in the drawings.

FIG. 1 to FIG. 5 are diagrams showing a lumbar support structure 1 according to an embodiment of the present invention, and a seat structure 100 installed with the lumbar support structure1. As shown in these drawings, the lumbar support structure 1 of the present embodiment is provided between side frames 111*a*, 111*a* of a back frame 111 of a seat back 110. Particularly, the back frame 111 has the pair of side frames 111*a*, 111*a*, an upper frame 111*b* having a substantially U-shape bridged between the upper portions of the side frames 111*a*, 111*a*, and a lower frame 111*c* bridged between the lower portions of the side frames 111*a*, 111*a*. The back frame 111 is supported inclinably by a cushion frame 121 of a seat cushion 120. The back frame 111 is formed in a square shape in this way and does not include in an inside, a skeleton member supporting a back cushioning member 112. The back cushioning member 112 is bridged in the back frame 111 to be a tensile structure, thereby supporting a back of a seated person.

The back cushioning member 112 is composed of a two-dimensional fabric, a three-dimensional fabric, or a combination thereof. As the two-dimensional fabric, a cloth or net including an elastic yarn in at least one of a warp and a weft, or a cloth or net not including an elastic yarn can be used. As the three-dimensional fabric, a three-dimensional knitted fabric or a three-dimensional fabric can be used. The combination includes a structure in which any of the fabrics mentioned above is stretched in the back frame 111 as a base net and a skin using any of the fabric mentioned above is installed so as to cover the base net. In addition, the one in which a cushion material such as a thin urethane material is stacked in these fabrics can be used.

Figure 2:
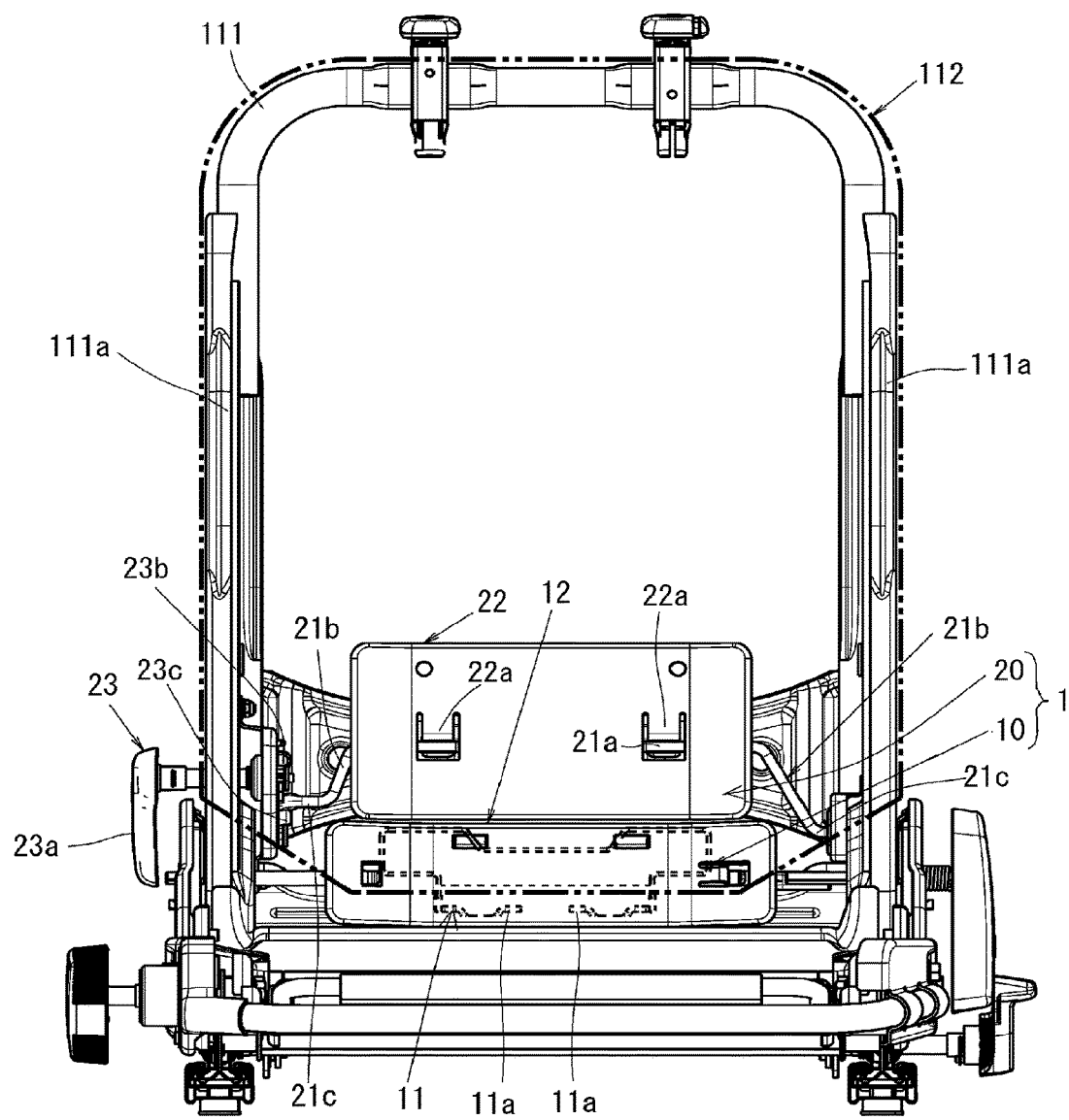
FIG. 2 is a front view of FIG. 1.
Figure 3:
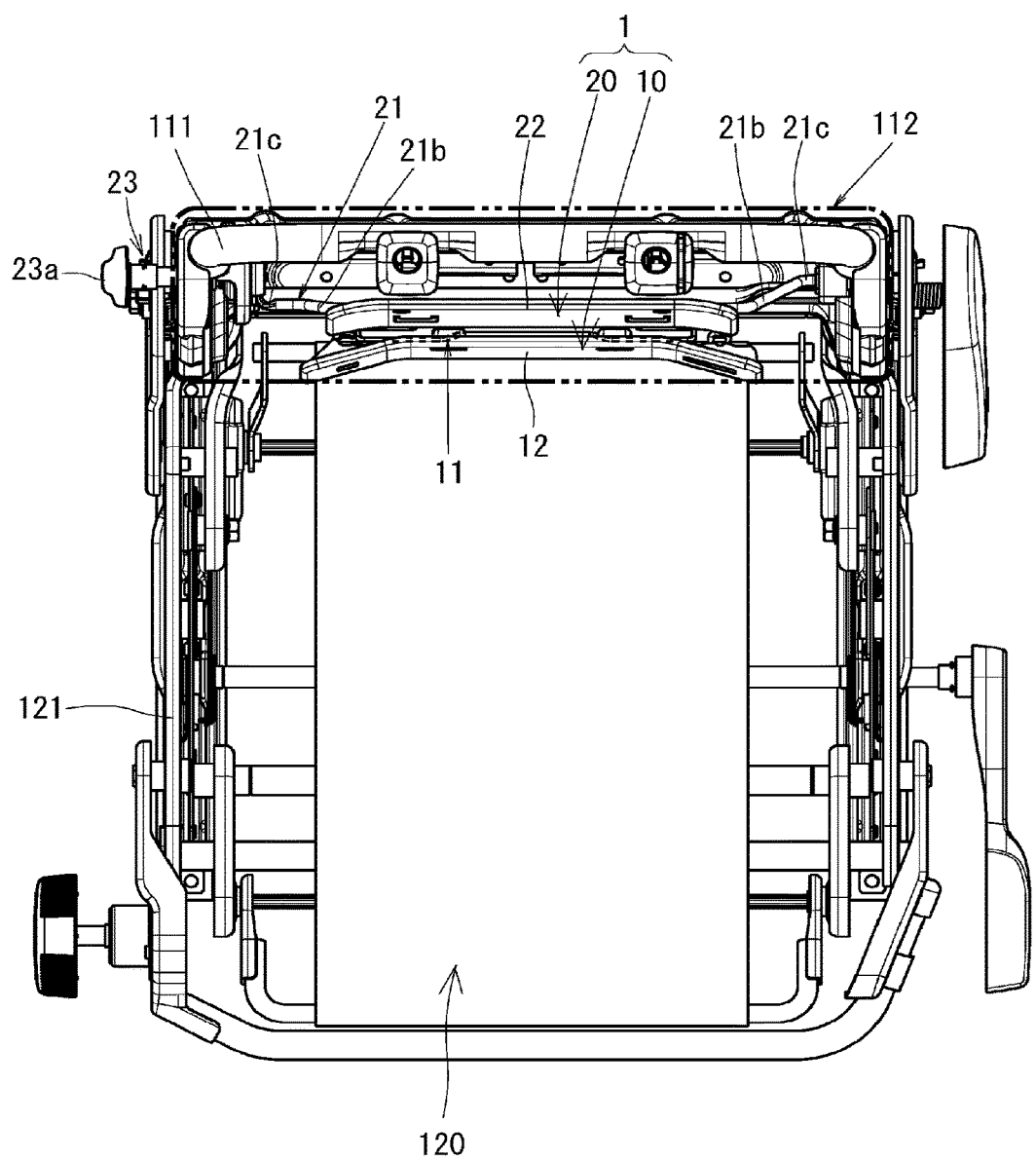
FIG. 3 is a plane view of FIG. 1.

The lumbar support structure 1 of the present embodiment is configured by including a lower lumbar support 10 and an upper lumbar support 20. The lower lumbar support 10 has a first torsion bar 11 and a first support plate 12. As shown in FIG. 1 and FIG. 2, the first torsion bar 11 has a substantially rectangle shape when viewed from the front. The first torsion bar 11 is arranged with each of end portions 11*a*, 11*a* in a position corresponding to a lower side, while the first torsion bar 11 is processed to have a shape so that the end portions 11*a*, 11*a* are spaced apart without contacting with each other.

The first support plate 12 is formed of a synthesized resin, is formed to have a substantially rectangle shape, and is arranged so that its longitudinal direction is along a width direction of the back frame 111. It is preferable that the longitudinal direction has enough length to support a pelvic part of a human. It is preferable that the longitudinal direction is formed to have a curved shape so that a vicinity of a center of the longitudinal direction is located rearward in order to reduce discomfort (see FIG. 3).

An upper side portion 11*b* of the first torsion bar 11 is connected to a back surface that is near an upper edge portion 12*a* of the first support plate 12. Each of the end portions 11*a*, 11*a* of the first torsion bar 11 is connected to an engaging portion 111*d* provided near the rearward in a side view, in a lower portion of the back frame 111 (see FIG. 4 and FIG. 5). At this time, the first torsion bar 11 is set so that the upper side portion 11*b* is energized forward having each of the end portions 11*a*, 11*a* as a center. Accordingly, when the first support plate 12 supported by the upper side portion 11*b* is installed in a back-surface side of the back cushioning member 112, the first support plate 12 energizes the lower portion of the back cushioning member 112 forward, and a restoring force is imparted to the back cushioning member 112. The lower lumbar support 10 is preferably set in a position where the first support plate 12 corresponds to the pelvic part of the seated person. Thereby, the pelvic part of the seated person can be supported by the elastic force of the first torsion bar 11, and by the restoring force imparted to the back cushioning member 112, a state where the back cushioning member 112 is tensioned can be established, and thereby, the appearance is improved.

The first support plate 12 is arranged in a portion corresponding mainly to the pelvic part in this way. Thus, the sense of contact of the first support plate 12 is hard to be perceived. Accordingly, an energizing force of the first torsion bar 11 is preferably set large to an extent of being able to support the pelvic part.

The upper lumbar support 20 has a second torsion bar 21, a second support plate 22, and a lumbar adjustment means 23. As shown in FIG. 1 and FIG. 2, in the first torsion bar 21, a center spring part 21a that is located at a center part and is long in a width direction, inclined spring parts 21b, 21b that are inclined in a substantially V-shape from both sides of the center spring part 21a, and each end portions 21c, 21c that are in a tip of extension from each of the inclined spring parts 21b, 21b outward in substantially horizontal, are supported by each of the side frames 111a, 111a of the cushion frame 111. Among these, one end portion 21c is connected to one side frame 111a. The other end portion 21c is connected to the lumbar adjustment means 23 provided in the other side frame 111a.

Particularly, the lumbar adjustment means 23 has an operation member 23a that is provided in an outer surface of the other side frame 111a, and a gear mechanism 23b that rotates by rotating the operation member 23a. The other end portion 21c of the second torsion bar 21 is connected to an output unit 23c of this gear mechanism 23b. Accordingly, when the operation member 23a of the lumbar adjustment means 23 is rotated in either forward or reverse direction, the other end portion 21c of the second torsion bar 21 rotates and the center spring part 21a and the inclined spring parts 21b, 21b rotate forward and rearward having one end portion 21c as a fixed end.

The second support plate 22 is formed of a synthetic resin and is formed to have a substantially rectangle shape when viewed from the front. The area is set in an appropriate size that can support the pelvic part of the seated person. However, similarly to the first support plate 11, the area is preferably formed in a curved shape in which the substantially center part protrudes rearward so that the second support plate 22 is easy to receive the back. In the substantially center part of a vertical direction in the back-surface of the second support plate 22, the engaging portions 22a, 22a for engaging the center spring part 21a of the second torsion bar 21 are provided. A connection position in one side frame 111a that engages the one end portion 21c of the second torsion bar 21 and a connection position in the lumbar adjustment means 23 that engages the other end portion 21c are set rearward from a surface of the back cushioning member 112 when viewed from a side surface (see FIG. 4 and FIG. 5). The second torsion bar 21 is provided so that the center spring part 21a is energized in a forward inclining direction. Thereby, when the center spring part 21a is connected to the engaging portions 22a, 22a, the second support plate 22 is energized forward by the elastic force of the second torsion bar 21.

The second support plate 22 is arranged in a position that is an upper portion of the first support plate 12 so as to support mainly the lumbar part of the seated person. By the seated person applying a body weight to the back cushioning member 112, the back cushioning member 112 strokes rearward according to elasticity of the second support plate 22. At this time, the vicinity of the lumbar part contacts with the second support plate 22. Thus, in order not to give the sense of contact, the spring constant of the second torsion bar 21 is set so as to have softer springiness than that of the first torsion bar 11 and so that its stroke is larger than the first support plate 11 when the load is applied.

The lumbar support structure 1 of the present embodiment has the lower lumbar support 10 and the upper lumbar support 20 that are arranged in vertically different heights in the back frame 111, as described above. The vicinity of the pelvic part is supported reliably so as to be pushed from diagonally downward to the front by the elasticity of the first torsion bar 11 that supports the first support plate 11 in the lower lumbar support 10. On the other hand, the vicinity of the lumbar part supports the second support plate 22 in the upper lumbar support 20 and is supported by the elastic force of the second torsion bar 21 having lower spring constant than that of the first torsion bar 11. Accordingly, the vicinity of the lumbar part is supported softly, and thereby the sense of contact of the second support plate 22 is reduced.

Figure 4:
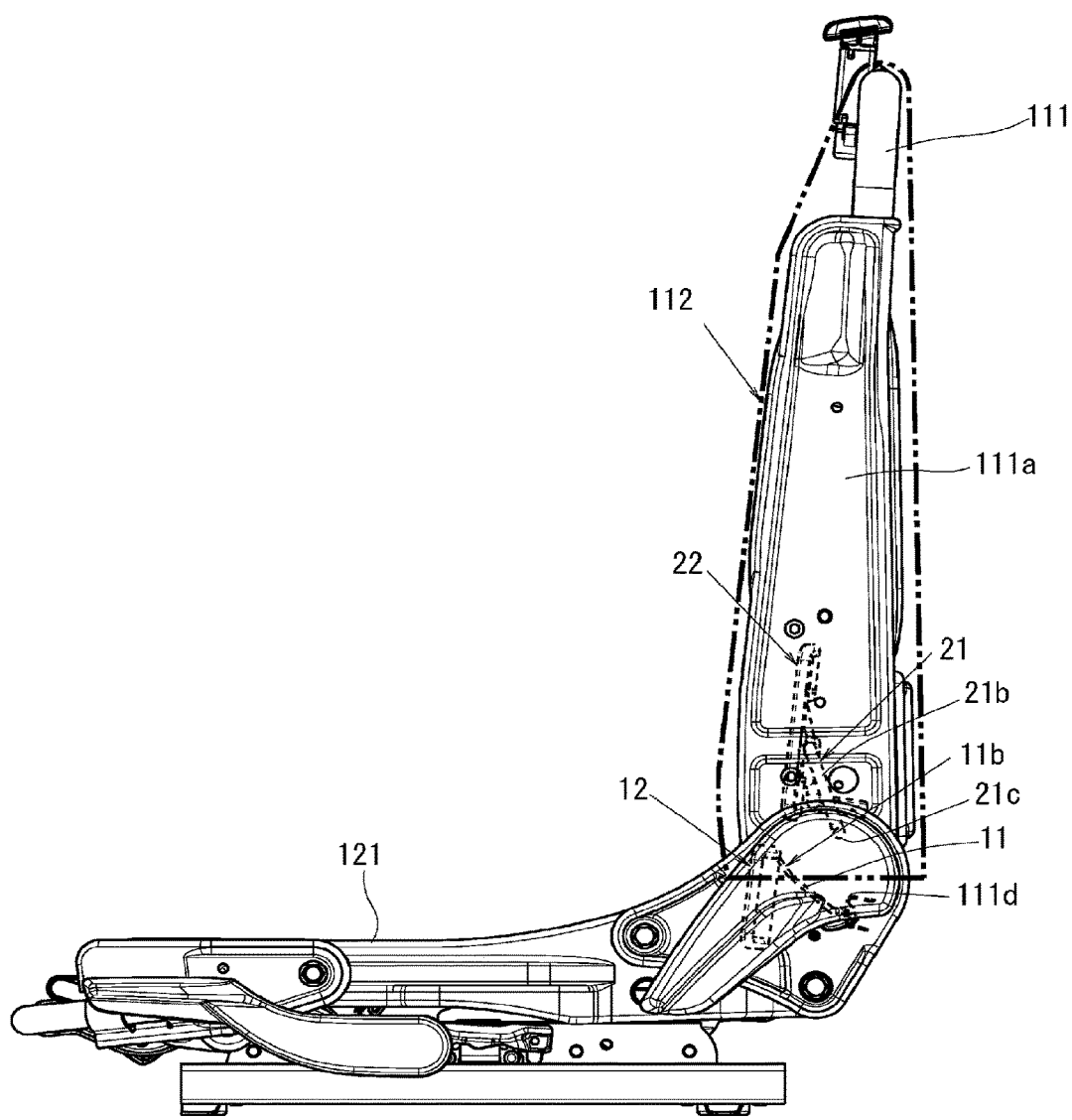
FIG. 4 is a side view of FIG. 1 and is a diagram showing a state where a lumbar support pressure of an upper lumbar support is adjusted to be low.
Figure 5:
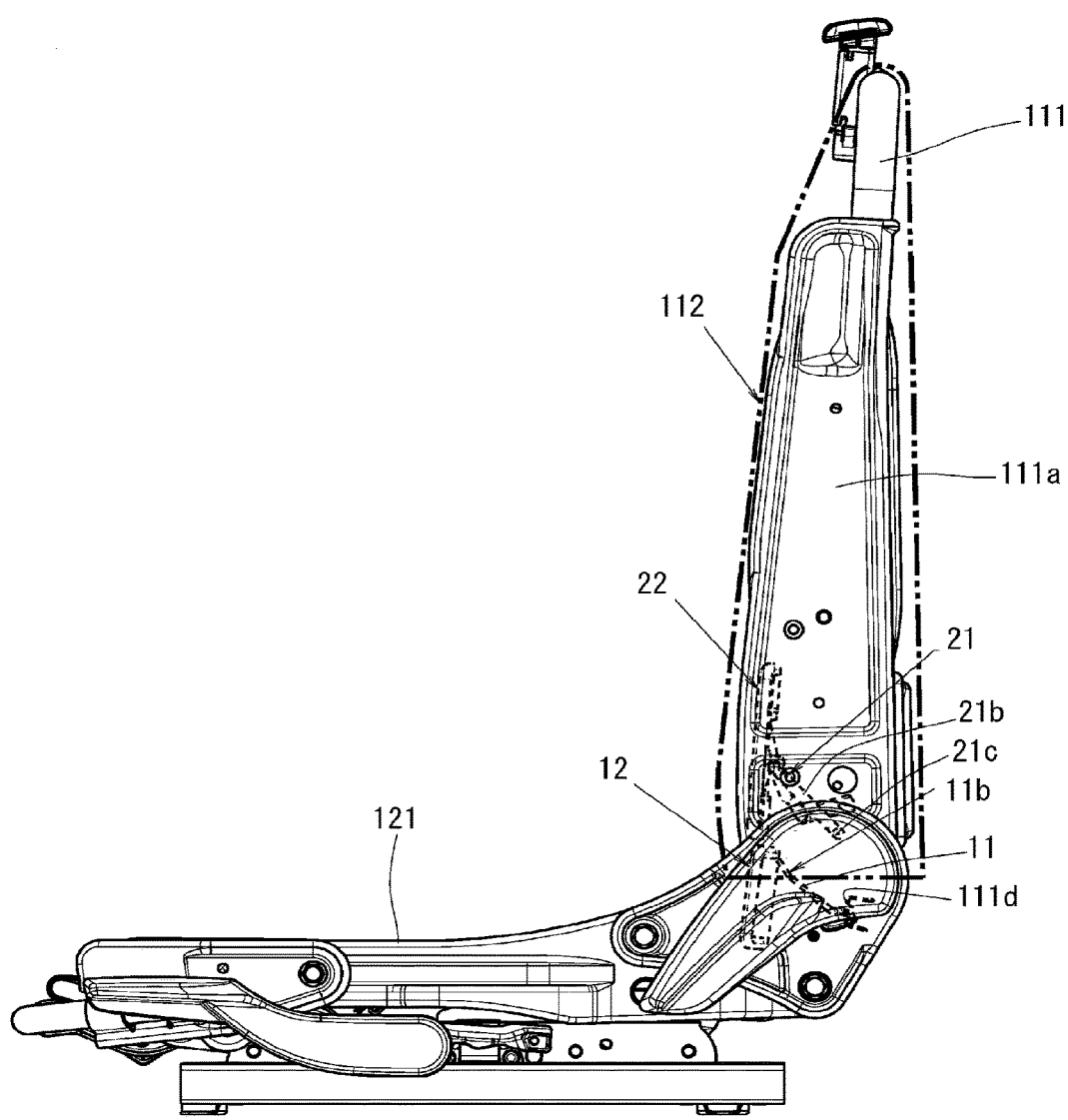
FIG. 5 is a side view of FIG. 1 and is a diagram showing a state where the lumbar support pressure of the upper lumbar support is adjusted to be high.

On the other hand, when the support pressure of the vicinity of the lumbar part needs to be adjusted, the operation member 23a of the lumbar adjustment means 23 is rotation operated in either forward or reverse. Thereby, the other end portion 21c of the second torsion bar 21 is twisted with respect to the one end portion 21c. When the support pressure of the lumbar part is reduced, as shown in FIG. 4, operation is made so that the center spring part 21a of the second torsion bar 21 and the inclined spring parts 21b, 21b are displaced rearward. Thereby, the position of the second support plate 22 is in rearward and the support pressure of the lumbar part is reduced. When the support pressure of the lumbar part is increased, as shown in FIG. 5, operation is made so that the center spring part 21a of the second torsion bar 21 and the inclined spring parts 21b, 21b are displaced forward and the position of the second support plate 22 becomes the front. Thereby, the support pressure of the lumbar part is increased.

In the second support plate 22, the engaging portions 22a, 22a that are engaged with the center spring part 21a of the second torsion bar 21 are set in a substantially center part of the vertical direction. Thereby, when the body weight is applied in the vicinity of the upper edge portion of the second support plate 22, the second support plate 22 is displaced so that the upper edge portion is inclined rearward having the engaging portions 22a, 22a as the center. Thus, followability to the posture change is high.

EXPLANATION OF REFERENCES

1 Lumbar support structure
10 Lower lumbar support
11 First torsion bar
12 First support plate
20 Upper lumbar support
21 Second torsion bar
22 Second support plate
100 Seat structure
110 Seat back
111 Back frame
111a Side frame

The invention claimed is:

1. A lumbar support structure arranged in a seat back,
the lumbar support structure being installed in a back-surface side of a back cushioning member having a tensile structure bridged in a back frame composing the seat back, said lumbar support structure comprising:
- a lower lumbar support that has a first torsion bar and a first support plate that is supported by the first torsion bar and can be displaced elastically by receiving a load, the first support plate being set in a lower portion of the back frame, the lower lumbar support supporting elastically the back cushioning member and imparting a restoring force; and
- an upper lumbar support that has a second torsion bar, a second support plate that is supported by the second torsion bar and can be displaced elastically by receiving a load, and
- a lumbar adjuster that twists the second torsion bar and adjusts a position of the second support plate to front and back, the second support plate being set in an upper portion of the first support plate, wherein the first support plate of the lower lumbar support is set in a position corresponding to a pelvic part of a seated person, and the second support plate of the upper lumbar support is set in a position corresponding to a lumbar part of the seated person, and an upper side portion of the first torsion bar is connected to near an upper edge portion of the first support plate, each of end portions of the first torsion bar is connected to an engaging portion provided near the rearward in a side view and the first torsion bar is set so that the upper side portion is energized forward.

2. The lumbar support structure according to claim 1, wherein the back cushioning member is configured by including a two-dimensional fabric, a three-dimensional fabric, or a combination thereof.

3. A seat structure comprising a seat back having a back cushioning member having a structure bridged in a back frame, and
- the lumbar support structure according to claim 1 incorporated in a back-surface side of the back cushioning member.

4. The lumbar support structure according to claim 1, wherein the second support plate is supported by and is engaged with a center spring part of the second torsion bar in a substantially center part of the vertical direction of the second support plate.

* * * * *